United States Patent [19]

Narayan et al.

[11] 4,197,374

[45] Apr. 8, 1980

[54] CELLULAR PRODUCTS BASED ON HALOCARBOXYLIC ACID-MODIFIED POLYISOCYANATES

[75] Inventors: Thirumurti Narayan, Riverview, Mich.; Harald P. Wulff, Baton Rouge, La.

[73] Assignee: BASF Wyandotte Corporation, Wyandotte,, Mich.

[21] Appl. No.: 942,981

[22] Filed: Sep. 18, 1978

[51] Int. Cl.² .................. C08G 18/14; C08G 18/77
[52] U.S. Cl. .................. 521/162; 260/453 AR; 521/157; 521/160; 521/902
[58] Field of Search .............. 521/157, 160, 162, 155

[56] References Cited

U.S. PATENT DOCUMENTS

| | | | |
|---|---|---|---|
| 3,036,999 | 5/1962 | Worsley et al. | 521/160 |
| 3,489,696 | 1/1970 | Miller | 521/160 |
| 3,562,189 | 2/1971 | Farrissey et al. | 521/160 |
| 3,660,326 | 5/1972 | Mallabar | 521/160 |
| 3,887,502 | 6/1975 | Adams | 521/160 |
| 3,988,268 | 10/1976 | Dietrich | 521/162 |
| 4,013,701 | 3/1977 | Jabs et al. | 521/162 |

Primary Examiner—H. S. Cockeram
Attorney, Agent, or Firm—Joseph D. Michaels; Arnold S. Weintraub

[57] ABSTRACT

Stable, liquid polyisocyanate compositions are prepared by reacting a polyisocyanate or a mixture of polyisocyanates and halogen-containing carboxylic acids. The polyisocyanates hereof are used to prepare polyurethanes, polyisocyanurates, poly(isocyanurate-urethane) and the like. These isocyanates can be used in foam formation, films, fibers, coating solutions, elastomers and the like.

12 Claims, No Drawings

CELLULAR PRODUCTS BASED ON HALOCARBOXYLIC ACID-MODIFIED POLYISOCYANATES

BACKGROUND OF THE INVENTION

1. Field of the Invention

The present invention pertains to polyisocyanates. More particularly, the present invention pertains to liquid polyisocyanates. Even more particularly, the present invention pertains to liquid polyisocyanates modified by the incorporation of haloamide moieties thereinto and cellular products prepared therefrom.

2. Prior Art

The production of isocyanates and polyisocyanates is, well-known. These compositions enjoy particular utility in the preparation of polymeric compositions, such as polyurethanes, isocyanurate products, carbodiimide products and the like. These latter compounds are documented.

The art has strived to produce new polyisocyanates to tailor the properties of the products derived therefrom. One of the more sought after properties to be achieved in polymeric compositions is flame retardancy. Thus, the art has taught the incorporation of flame retardants such as halogen, phosphorus, amide and similar elements and structures thereinto. It is to be appreciated from a review of the prior art, however, that the flame retardants are incorporated via the polyol reactant or as a separate reactant. Little consideration has been given to incorporating flame retardant properties via a polyisocyanate reactant.

For example, in U.S. Pat. No. 3,970,600, there is disclosed a stable, liquid homogeneous solution of isocyanurate and polyisocyanate which incorporates amide and/or acylurea thereinto. In U.S. Pat. No. 3,823,158, there is disclosed the products prepared from the reaction of (1) a mixture of a polyaryl polyisocyanate consisting of 2 to 10 benzene or methyl, ethyl or propyl substituted benzene rings having one isocyanate functional group per ring, and (2) a compound selected from the group consisting of phthalic anhydride, tetrachlorophthalic anhydride, tetrabromophthalic anhydride and chlorendic anhydride. The reaction proceeds at a temperature of between 150° C. and 300° C. The polyaryl isocyanate and anhydride are employed in a respective weight ratio of between 2:1 to 10:1. The resulting products are characterized by polyimide linkages.

In U.S. Pat. No. 3,637,543, there is disclosed thermally stable resins and foams derived from aromatic carboxylic acid derivatives which are polyfunctional. The products, more precisely, comprise the reaction product of (1) a benzene nucleus substituted with either an anhydride, carboxyl or acyl halide, (2) a polyaryl polyisocyanate and (3) a polyol containing at least three hydroxyl groups.

Again, it is to be appreciated that this prior art summarily fails to teach modification of the isocyanate reactant, per se, by the incorporation of halogen-containing moieties.

The present invention, as will subsequently be detailed, introduces haloamide moieties into the polyisocyanate reactant.

STATEMENT OF RELEVANT ART

To the best of applicants' knowledge the most closely related art is found in U.S. Pat. Nos.:

3,970,600,
3,637,543,
3,746,689,
3,205,201,
3,932,359,
3,823,158,
2,797,232,
3,080,368,
4,053,439,
3,317,480.

SUMMARY OF THE INVENTION

Stable, liquid polyisocyanates are prepared by reacting polyisocyanates and halogen-containing carboxylic acids. The reaction therebetween incorporates haloamide moieties into the isocyanate. The haloamide moiety enables the production of isocyanate products, e.g. polyurethane and poly(isocyanurate urethane) cellular products, having improved flame-retardant and heat aging properties.

The halogen-containing carboxylic acids may be either mono-or dicarboxylic acids corresponding to the formulae:

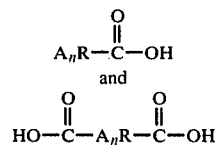

A is halogen, n is an integer from 1 to about 16, R is either $C_1$ to $C_{20}$ alkyl, $C_2$ to $C_{20}$ alkylene, cycloalkyl having from about 5 to 10 ring carbon atoms, cycloalkylene having from about 5 to 10 ring carbon atoms, aryl having from about 6 to 12 carbon atoms, alkaryl having from 7 to 12 carbon atoms, aralkyl having from 7 to 12 carbon atoms, or heterocyclyl containing about 5 to 10 ring carbon atoms and the hetero atom is nitrogen, sulfur, oxygen or phosphorous. Of course, R can only be alkylene or cycloalkylene when a dicarboxylic acid is employed.

The isocyanate is either a monomeric polyisocyanate or an isocyanate-terminated quasi-prepolymer.

The acid is present in less than stoichiometric quantities of acid to enable the product to have some remaining isocyanate functions.

Cellular products are prepared from the new isocyanates by conventional techniques.

For a more complete understanding of the present invention, reference is made to the following detailed description and accompanying examples.

DESCRIPTION OF THE PREFERRED EMBODIMENTS

In accordance with the present invention stable, liquid polyisocyanates are prepared by the reaction of a halogen-containing carboxylic acid and a polyisocyanate. The, thus, prepared polyisocyanate is, then, used to prepare derivatives thereof such as polyurethane, poly(isocyanurate-urethane) and the like. The new polyisocyanates can be used for foam formation, in films, fibers, coating solutions, elastomers and the like.

As noted, the polyisocyanates hereof are prepared by reacting a halogen-containing carboxylic acid and a polyisocyanate. The reaction, which is, preferably, carried out at less than stoichiometric equivalents of acid, incorporates haloamide moieties into the isocyanate.

This enables the preparation of products having improved flame retardant and heat-aging properties. Generally, the reaction proceeds at a temperature ranging from about 25° C. to about 150° C. for a period of from about one to ten hours. Preferably, the reaction is carried out at a temperature of from about 50° C. to about 125° C. for about one to ten hours to prepare the liquid products hereof. As noted, less than stoichiometric equivalents of acid are used to ensure the presence of isocyanate functions in the final product. Generally, the product has from about 15% to 40%, by weight, of isocyanate functions therewithin.

In carrying out the reaction, normally, an inert atmosphere is employed.

In practicing the present invention, the halogen-containing carboxylic acid employed herein is either a mono- or dicarboxylic acid corresponding to the formulae:

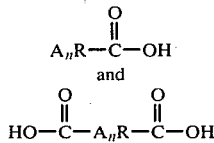

A is halogen, n is an integer from 1 to about 16, R is either $C_1$ to $C_{20}$ alkyl, $C_2$ to $C_{20}$ alkylene, cycloalkyl having from about 5 to 10 ring carbon atoms, cycloalkylene having from about 5 to 10 ring carbon atoms, aryl having from about 6 to 12 carbon atoms, alkaryl having from 7 to 12 carbon atoms, aralkyl having from 7 to 12 carbon atoms, or heterocyclyl containing about 5 to 10 ring carbon atoms and the hetero atom is nitrogen, sulfur, oxygen or phosphorous. Of course, R can only be alkylene or cycloalkylene when a dicarboxylic acid is employed.

Representative of the halogenated monofunctional acids used herein are, for example, mono-, di- and trichloroacetic acids; trichlorobutanoic acid; pentachloropentanoic; hexachloropentanoic acid; octafluoropentanoic acid; chloro- and bromocyclohexanecarboxylic acids; mono-, di-, tri-, tetra- and pentachlorobenzoic acids; chloronaphthoic acids and the like, as well as mixtures thereof.

Exemplifying the useful dicarboxylic acids, for example, dichlorosuccinic acid, tetrachlorosuccinic acid, hexadecafluorodecanedioic acid, tetradecafluorononanedioic acid, octafluorohexanedioic acid, hexafluoropentanedioic acid, mono-, di-, tri- and tetrabromo or/chloro, ortho, iso or terephthalic acids, chloro- or bromocyclohexanedicarboxylic acids and the like as well as mixtures thereof.

The isocyanate reactant used to prepare the products hereof can be either monomeric polyisocyanates or isocyanate-terminated quasi-prepolymers derived from polyisocyanates which correspond to the formula:

wherein X is an integer corresponding to the valence of $R_1$ and ranges from 2 to 4 and $R_1$ is a polyvalent organic radical which is either aliphatic, aralkyl, alkaryl, aromatic or mixtures thereof.

Representative of the organic polyisocyanates contemplated herein includes, for example, the aromatic diisocyanates, such as 2,4- toluene diisocyanate and mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4'4''-triphenylmethane triisocyanate, 2,4,6-toluene triisocyanate; the aromatic tetraisocyanates, such as 4,4'-dimethyldiphenylmethane-2,2',5,5'-tetraisocyanate, and the like; aralkyl polyisocyanates, such as xylylene diisocyanate; aliphatic polyisocyanates, such as hexamethylene, diisocyanate, lysine diisocyanate methyl ester and the like, and mixtures thereof. Other useful organic polyisocyanates include:
polymethylene polyphenylisocyanate,
hydrogenated diphenylmethane diisocyanate,
m-phenylene diisocyanate,
naphthylene-1,5-diisocyanate,
1-methoxyphenyl-2,4-diisocyanate,
diphenylmethane-4,4'-diisocyanate,
4,4'-biphenylene diisocyanate,
3,3'-dimethoxy-4,4'-diphenylene diisocyanate,
3,3'-dimethyl-4,4'-biphenylene diisocyanate, and
3,3'-dimethyldiphenylmethane-4,4'-diisocyanate,
and the like.

These polyisocyanates are prepared by conventional methods in the art such as the phosgenation of the corresponding organic amine.

The isocyanate-terminated quasi-prepolymers are prepared by racting less than stoichiometric quantities of any of the above-enumerated polyisocyanates with an active hydrogen-containing compound, optionally, in the presence of a urethane catalyst. The reaction, generally, proceeds at a temperature ranging from about 20° C. to about 80° C. for a time period ranging from about one to two hours.

Suitable active hydrogen-containing compounds for preparing the quasi-prepolymers hereof are those containing at least two active hydrogen-containing groups which are isocyanate reactive. Typifying such compounds are hydroxyl-containing polyesters, polyalkylene polyether polyols, hydroxy-terminated polyurethane polymers, polyhydric polythioethers, alkylene oxide adducts of phosphorous-containing acids, polyacetals, aliphatic polyols, aliphatic thiols including alkane, alkene and alkyne thiols having two or more —SH groups; as well as mixtures thereof. Compounds which contain two or more different groups within the above-defined classes may also be used such as, for example, compounds which contain one —SH and one —OH group.

Any suitable hydroxyl-containing polyester may be used such as are obtained, for example, from polycarboxylic acids and polyhydric alcohols. Any suitable polycarboxylic acid may be used, such as oxalic acid, malonic acid, succinic acid, glutaric acid, adipic acid, pimelic acid, suberic acid, azelaic acid, sebacic acid, brassylic acid, thapsic acid, maleic acid, fumeric acid, glutaconic acid, α-hydromuconic acid, β-hydromuconic acid, butyl-α-ethylglutaric acid, α,β-diethylsuccinic acid, isophthalic acid, terephthalic acid, hemimellitic acid, and 1,4-cyclohexanedicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimerthylolpropane, 1,1,1-trimethylolethane hexane-1,2,6-triol, α-methylglucoside, pentaerythritol, and sorbitol. Also, included within the term "polyhydric alcohol" are compounds derived from phenol such as 2,2-bis(4-hydroxyphenyl) propane, commonly known as Bisphenol A.

Any suitable polyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran, alkylene oxide tetrahydrofuran mixtures; epihalohydrins, such as epichlorohydrin; as well as aralkylene oxides such as styrene oxide. The polyalkylene polyether polyols may have either primary or secondary hydroxyl groups and, preferably, are polyethers prepared from alkylene oxides having from 2 to 6 carbon atoms such as polyethylene polyether glycols, polypropylene polyether glycols, and polybutylene polyether glycols. The polyalkylene polyether polyols may be prepared by any known process such as, for example, the process disclosed by Wurtz in 1859 and Encyclopedia of Chemical Technology, vol 7, pp. 257–262, published by Interscience Publishers, Inc. (1957) or in U.S. Pat. No. 1,992,459.

Any suitable polyhydric polythioether may be used such as, for example, the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester-amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-containing polyester with only a portion of the components being a diamine such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol; 1,3-propanedithiol, and 1,6-hexanedithiol; alkene thiols such as 2-butene-1, 4-dithiol; and alkyne thiols such as 3-hexyne-1,6-dithiol.

Other compounds which do not necessarily fit within any of the previously set forth classes of compounds which are quite suitable in the production of these other quasi-prepolymer compounds include the hydroxy-terminated polyurethane polymers such as a hydroxy-terminated polymer made by reacting the isocyanate with several moles of an alkylene glycol.

Within the broad class of isocyanates used to prepare the products hereof, the preferred isocyanate is crude methylenediphenyl diisocyanate. The reaction of the acid and the isocyanate realizes a product having free isocyanate functions and which incorporates haloamide moities thereinto. Depending upon whether a mono- or dicarboxylic acid is employed, the isocyanates hereof will correspond to the formulae:

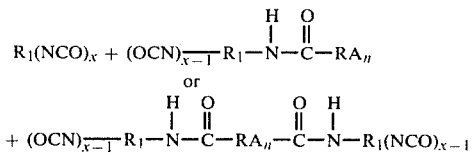

or

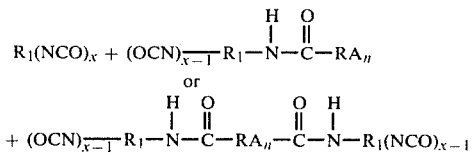

wherein R; $R_1$; X; A; n have the nomenclatures denoted above.

As noted the instant liquid polyisocyanates may be used in the preparation of foams, films, fibers, coating solutions and elastomers. The isocyanates hereof enjoy particular utility in the preparation of cellular polyurethanes and poly(isocyanurate-urethane).

In preparing a polyurethane, conventional techniques are employed. The polyurethane is prepared by reacting the instant isocyanate, alone, or in admixture with another isocyanate with an active hydrogen compound, such as those enumerated above with respect to prepolymer formation. Such reactions are carried out in the presence of surfactants, blowing agents, plasticizers, catalysts and the like. The catalysts are conventional urethane catalysts, such as those denoted in U.S. Pat. No. 3,994,837 and in the amounts specified therewithin. In preparing the urethane foam the polyisocyanate and polyol or polyols are used in an equivalent basis of substantially 1:1.

The poly(isocyanurate-urethane) foams are prepared from substantially the same additives as the polyurethane foam. However, the catalysts is a co-catalyst of urethane catalyst and isocyanate trimerization catalyst. Such trimer catalysts are enumerated in U.S. Pat. No. 3,994,837 as well as in U.S. Pat. Nos. 3,766,103; 3,723,366 and 3,717,596. The surfactants, polyols, blowing agents and plasticizers are those conventionally taught by the art. Herein, the isocyanate/polyol equivalent ratio varies from about 2:1 to about 100:1. Conventional techniques, as noted, are used to prepare the foams.

For a more complete understanding of the present invention reference is made to the following examples. In the examples, which are to be construed as illustrative, and not limitative, of the invention, all parts are by weight absent contrary indications.

EXAMPLE I

A series of halocarboxylic acid-modified polyisocyanates were prepared by the following procedure:

Into a two-liter reaction flask equipped with agitation means; thermometer; heating means; air condenser connected to a DRIERITE tube and under a nitrogen blanket was charged a quantity of a polyisocyanate. Thereafter, a halogenated carboxylic acid was added thereto over a 20 minute period at a temperature of about 25° C. The reaction contents were then heated to 100° C. and maintained thereat for the reaction time. During the reaction, the gas evolved was monitored with a saturated barium hydroxide solution. At the end of the reaction time a negative test for $CO_2$ was indicated by the saturated barium hydroxide solution.

The following table, Table I, sets forth the amounts of ingredients; reaction times; isocyanates content and viscosity of the product. Each product was prepared from crude methylene diphenyl diisocyanate and trichloroacetic acid.

TABLE I

| | A | B | C | D |
|---|---|---|---|---|
| Isocyanate, amt. pbw | 1000(7.5eqs) | 1000(7.5eqs) | 800(6.0eqs) | 2000(15 eqs) |
| Acid, amt. pbw | 81.7(0.5eqs) | 163.4(1.0eqs) | 130.7(0.8eqs) | 210(1.22eqs) |
| Reaction time, hrs. | 6 | 8 | 6.5 | 9.5 |
| Isocyanate Found, wt% | 27.7 | 24.7 | 24.6 | 26.7 |
| Brookfield Viscosity, cps, 25°–27° | 425 | — | 1826 | 645 |

After storage for eight months after preparation Product D had an isocyanate value of 26.6%, by weight, thus, evidencing the storage stability of the product.

EXAMPLE II

This example illustrates the preparation of cellular poly(isocyanurate-urethane) foams from the polyisocyanates of Example I.

Each of the foams were prepared by the following procedure:

Into a suitable reaction vessel equipped with high speed agitation means was charged a pre-determined quantity of a modified polyisocyanate in accordance with Example I and a quantity of trichloromonofluoromethane blowing agent.

In a 50 mls. plastic syringe was admixed a polyol system of polyol(s), surfactant and catalyst.

Stirring was commenced and the polyol system was rapidly added thereto. Stirring was continued for five seconds after the addition was completed. The mixture was, then, transferred to a 10"×10"×4" vertical mold and allowed to rise therein.

The foams were demolded after thirty minutes and allowed to remain at ambient conditions for two days before the mechanical property determination.

The foam properties, ingredients, observed parameters and conditions are set forth below in Tables II–IV.

TABLE II

| Sample | Isocyanate type, Amt. pbw | Blowing agent Amt, pbw | Polyol Amt, pbw | Surfactant Amt. pbw | Catalyst, Type |
|---|---|---|---|---|---|
| Foam 1 | C, 232 | 55 | 40(a) | 2 | X(d) |
| Foam 2 | D, 220 | 50 | 44(b) | 2 | Y(e) |
| Foam 3 | D, 220 | 50 | 40(a) | 2 | Y |
| Foam 4 | D, 220 | 50 | 44(b) | 2 | Y |

(a) a polyol consisting of 30 parts of an oxyethylated toluene diamine having a hydroxyl number of about 444 and 10 parts of the oxypropylated reaction product of tetrabromophthalic anhydride and an oxypropylated pentaerythritol, and having a hydroxyl number of 233.
(b) 4 parts and 10 parts, repectively, of the polyols of footnote (a)in admixture with 30 parts of an oxyethylated trimethylolpropane having a hydroxyl number of 225.
(c) a siloxane sold under the name DC-193 by Dow-Corning.
(d) a catalyst consisting essentially of 0.5 part furfuryl alcohol, 4 parts 1,3,5-tris(3-dimethylaminopropyl)-s-hexahydrotriazine and 0.2 parts dibutyltin diacetate.
(e) reaction product of 2 parts N,N-dimethylamincethanol, 1.2 partspropylene oxide and 3.3 parts 2-ethylhexanoic acid dissolved in 3.4 parts isopropylene glycol.

Each of the foam samples had the following observed parameters:

TABLE III

| | REACTIVITY,SECONDS | | | |
|---|---|---|---|---|
| Sample | Cream Time | Gel Time | Rise Time | Tack-Free Time |
| Foam 1 | 7 | 20 | 145 | 30 |
| Foam 2 | 8 | 15 | 30 | 30 |
| Foam 3 | 8 | 20 | 35 | 35 |
| Foam 4 | 8 | 15 | 30 | 30 |

The following table, Table IV, sets forth the physical properties of the poly(isocyanurate-urethane) foams of this series:

TABLE IV

| | SAMPLE | | | |
|---|---|---|---|---|
| Property | Foam 1 | Foam 2 | Foam 3 | Foam 4 |
| Density, pcf | 2.1 | 2.0 | 1.5 | 1.8 |
| Compression Strength, psi, 10% Defl | 20 | — | — | — |
| K Factor, initial | 0.122 | 0.112 | 0.116 | 0.123 |
| K Factor, aged 10 days at 40° F. | 0.185 | 0.135 | 0.139 | 0.155 |
| Friability, wt. loss | 26 | 4 | 6 | 4 |
| Butler Chimney Test wt. retained, % | 85 | 83 | 73 | 85 |
| Time to SX, sec | 10 | 10 | 11 | 10 |
| Flame Ht, in | 7 | 6 | 8 | 6 |
| NBS Smoke Density, Dm | 194 | 73 | 61 | 85 |

The data shows the balance properties of the foams.

EXAMPLE III

A further series of cellular products were prepared by the following procedure:

Into a suitable reaction vessel equipped with high speed agitation means was charged a quantity of the isocyanate of Example I denoted as Product D in admixture with a quantity of trichloromonofluoromethane blowing agent. In a syringe was charged a quantity of polyol(s), water, surfactant, plasticizer and a urethane catalyst.

After agitation in the vessel commenced, the blend in the syringe was added to the vessel as rapidly as possible. The mixture was, then, stirred for ten seconds.

Thereafter, the mixture was transferred to a container wherein foam formation was conducted.

The following table, Table V sets forth the reactants, amounts, and observed parameters of the foams of the series, which were polyurethane foams.

TABLE V

| | | | RESIN COMPONENT | | | | | | REACTIVITY, SECONDS | | | | |
|---|---|---|---|---|---|---|---|---|---|---|---|---|---|
| Sample | Isocyanate Amt. pbw | Blowing Agent Amt., pbw | Plasticizer(f) Amt, pbw | Polyol 1(a) Amt, pbw | Polyol 2(b) Amt, pbw | Catalyst A(c) Amt., pbw | Catalyst B(d) Amt., pbw | Catalyst C(e) Amt., pbw | Cream Time | Tack Gel Time | Rise Time | Free Time | Density, pcf |
| I | 72.6 | 16.5 | 7.5 | 25.5 | 17.0 | — | 1.5 | — | 15 | 100 | 200 | 160 | — |
| II | 72.6 | 16.5 | 7.5 | 25.5 | 17.0 | 0.5 | — | 0.1 | 15 | 50 | 90 | 62 | — |
| III | 181.5 | 41.3 | 18.8 | 63.8 | 42.5 | 1.25 | — | 0.25 | 15 | 45 | 72 | 55 | 1.9 |

(a) an oxypropylated toluene diamine having a hydroxyl number of 387
(b) an oxypropylated pentaerythritol having a hydroxyl number of 555
(c) dimethylcyclohexylamine
(d) N,N-dimethylaminoethanol
(e) dibutyltin dilaurate
(f) tris(2-chloroethyl) phosphate Having, thus, described the invention what is claimed is:

1. A stable, liquid polyisocyanate consisting essentially of the reaction product of a polyisocyanate and a halogen-containing polycarboxylic acid, the acid being selected from the group consisting of monochloroacetic acid; dichloroacetic acid; trichloroacetic acid; trichlorobutanoic acid; pentachloropentanoic acid; hexachloropentanoic acid; octafluoropentanoic acid; chlorocyclohexanecarboxylic acids; bromocyclohexanecarboxylic acid; mono, di-, tri-, tetra- and pentachlorobenzoic acids; chloronaphthoic acids; dichlorosuccinic acid; tetrachlorosuccinic acid; hexadecafluorodecanedioic acid; tetradecafluorononanedioic acid; octafluorohexanedioic acid; hexafluoropentanedioic acid; mono-, di-, tri- and tetrabromo ortho, iso or terephthalic acids; mono-, di-, tri- and tetrachloro ortho, iso or terephthalic acids, chlorocyclohexanedicarboxylic acids, bromocyclohexanedicarboxylic acids, as well as mixtures thereof, and
   wherein the liquid polyisocyanate has a free NCO— content from about 15 percent to about 40 percent, by weight, based on the total weight of the liquid polyisocyanate.

2. The stable, liquid polyisocyanate of claim 1 wherein:
   the acid is trichloroacetic acid.

3. The stable, liquid polyisocyanate of claim 1 wherein:
   the acid is trichloroacetic acid.

4. The stable, liquid polyisocyanate of claim 1 wherein:
   the polyisocyanate reactant is a monomeric polyisocyanate or an isocyanate-terminated quasi-prepolymer derived from a polyisocyanate of the formula:

$$R_1(NCO)_x$$

wherein $R_1$ is a polyvalent organic radical which is either aliphatic, aralkyl, alkaryl, aromatic or mixtures thereof and x is an integer corresponding to the valence of $R_1$ and is at least 2.

5. The stable, liquid polyisocyanate of claim 4 wherein:
   the polyisocyanate reactant is crude methylene diphenyldiisocyanate.

6. The stable, liquid polyisocyanate of claim 1 wherein:
   the polyisocyanate reactant is crude methylene diphenyldiisocyanate.

7. The polyisocyanate of claim 1 wherein:
   the polyisocyanate reactant and acid are reacted using less than stoichiometric equivalent quantities of acid.

8. In a method for forming a cellular product comprising reacting a polyisocyanate with an active-hydrogen containing compound, the improvement which comprises:
   employing as the polyisocyanate, the stable, liquid polyisocyanate of claim 1.

9. The improvement of claim 8 wherein:
   the cellular product is a polyurethane.

10. The improvement of claim 9 wherein:
    the polyisocyanate and active hydrogen-containing compound are employed in an equivalent weight ratio of about 1:1.

11. The improvement of claim 10 wherein:
    the cellular product is a poly(isocyanurate-urethane).

12. The improvement of claim 11 wherein:
    the polyisocyanate and active hydrogen-containing compound are employed in an equivalent weight ratio of from about 2:1 to about 100:1.

* * * * *